July 1, 1924.

J. W. BROWN, JR 1,499,851

SWIVEL JOINT FOR PIPES

Filed June 24, 1921

WITNESSES:
Robert Carulla
Meyer Heiman

INVENTOR.
John Wilson Brown Jr.
BY
ATTORNEY.

Patented July 1, 1924.

1,499,851

UNITED STATES PATENT OFFICE.

JOHN WILSON BROWN, JR., OF PHILADELPHIA, PENNSYLVANIA.

SWIVEL JOINT FOR PIPES.

Application filed June 24, 1921. Serial No. 479,985.

*To all whom it may concern:*

Be it known that I, JOHN WILSON BROWN, Jr., a citizen of the United States, residing in Philadelphia, Pennsylvania, have invented a new and Improved Swivel Joint for Pipes, of which the following is a specification.

The object of my invention is to provide a simple and effective means of connecting together two pipes containing fluid under pressure one of which pipes has a motion of rotation with respect to the other.

In the accompanying drawings; Fig. 1 is a longitudinal sectional view of the preferred form of my improved swivel joint, Figs. 2, 3 and 4 are longitudinal sectional views of modifications of the same.

Referring to Fig. 1, N is a pipe, $c$ is a tubular chamber connected to said pipe, $e$ $e$ are bushings mounted in said tubular chamber. These bushings may be of any substance, but are preferably of a somewhat elastic material possessing anti-friction properties such as wood impregnated with grease. These are pressed into $c$ with a pressure less than that which will be exerted on their ends by the liquid in the annular space $k$. By reason of the tightness of the fit between the exterior of the bushings $e$, $e$ and the tubular chamber $c$, said bushings cannot revolve in said chamber and a liquid tight joint is made between the exterior surface of said bushings and the wall of said chamber and the only relative movement possible between the tubular chamber and the bushings is the end movement of the latter due to the pressure of the liquid in the annular space $k$. M is a pipe fitting rotatably in the bushings $e$ $e$ and provided with flanges $a$ $a$ which retain in position the bushings when forced outward by the liquid in space $k$. No attempt is made to have the fit between the interior surfaces of the bushings $e$, $e$ and the exterior surface of the pipe M. These flanges and the ends of the bushings are fitted together so that when the bushings are pressed against the flanges by the fluid in the space $k$ there will be no leakage at this point. Bushings $e$, $e$ not only serve to prevent by their tightness in tubular chamber $c$, leakage along the walls of said chamber and by their contact with the flanges $a$, $a$, caused by the pressure of the liquid in the annular space $k$, to prevent leakage along the faces of these flanges, but they also serve to support the tubular chamber $c$ and the pipe M in their proper relation to one another said bushings being the bearings in which said pipe revolves. $j$ is an opening through the wall of pipe M providing a passage for fluid from annular space $k$ to the bore of pipe M or vice versa. While the drawing shows pipe M as having a bore which extends throughout its length it will be understood that for the purpose of my invention it is only necessary that the bore cover the opening $j$ and extend thence in one or the other direction. It will be understood that while the flanges $a$ $a$ are shown as integral with pipe M they may be secured thereto in any convenient manner.

Figure 3:
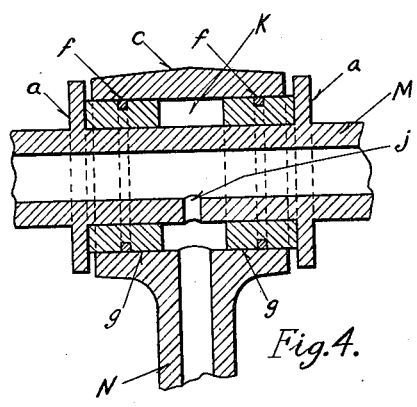
Fig. 3 shows a modification of my invention in which the bushings $b$ $b$ which correspond to the bushings $e$ $e$ do not depend on their size and elasticity for their fluid-tight joint with chamber $c$ but are provided with cupped leathers for this purpose.
Figure 1:
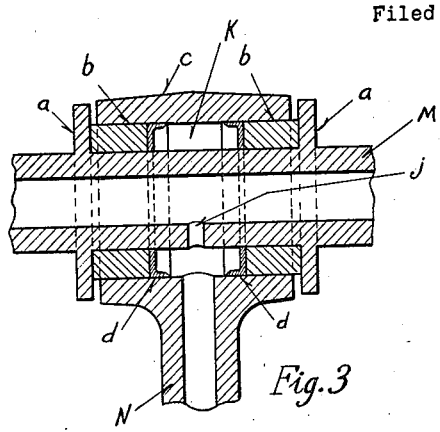
Figure 4:
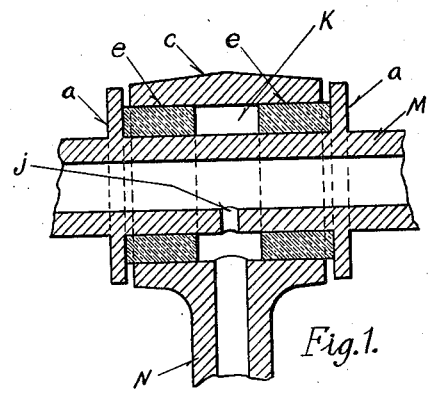
Figure 2:
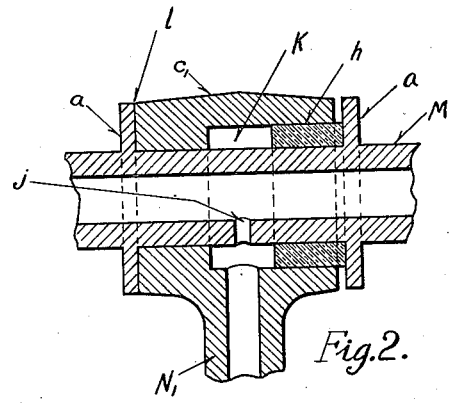
Fig. 2 shows a modification of my invention in which the tubular chamber $c_1$ is not bored straight through but has one end bored to fit pipe M and its end $l$ finished to coact with flange $a$ so that the action of the fluid in space $k$ is to force this end into contact with said flange preventing leakage at this point.

Fig. 4 shows a modification of my invention in which spring rings perform the function of the cupped leathers in Fig. 3. In all cases when in operation the bushings do not rotate in the tubular chamber but are sufficiently free in it to be forced outward by the liquid in space $k$ being at the same time so fitted that no leakage can take place between the exterior of the bushings and the interior of the tubular chamber, and the pipe M rotates in the bushings any fluid which may enter between the exterior of the pipe M and the bore of the bushings being stopped by the ends of the bushings, or, in case of Fig. 2 the end of the bushing and the end of the tubular chamber bearing against the flanges $a$ $a$. It will be seen that by this construction the only moving surfaces which require to be maitained in a fluid-tight condition are under pressure forcing them into contact and are provided with a continuous automatic adjustment for wear.

I claim—

1. The combination of a pipe, a tubular chamber connected to said pipe, bushings adapted to slide in said tubular chamber, a second pipe adapted to rotate in said bushings, flanges on said second pipe against which the ends of said bushings are forced by the pressure of the fluid in the tubular chamber and an opening through the wall of the second pipe.

2. The combination of a pipe, a tubular chamber connected to said pipe having a reduced portion, a bushing adapted to slide in said tubular chamber, a second pipe adapted to rotate in said bushing and said tubular chamber, flanges on said second pipe against which the end of said bushing and the end of the tubular chamber are forced by the pressure of the fluid in the tubular chamber and an opening through the wall of said second pipe.

3. The combination of a pipe, a tubular chamber connected to said pipe, bushings adapted to slide in said tubular chamber and forming supporting bearings for a second pipe adapted to rotate in said bushings, flanges on said second pipe against which the ends of said bushings are forced by the pressure of the fluid in the tubular chamber and an opening through the wall of the second pipe.

4. The combination of a pipe, a tubular chamber connected to said pipe having a reduced portion, a bushing adapted to slide in said tubular chamber and forming one of the supporting bearings for a second pipe adapted to rotate in said bushing and said tubular chamber, flanges on said second pipe against which the end of said bushing and the end of the tubular chamber are forced by the pressure of the fluid in the tubular chamber and an opening in the wall of the second pipe.

JOHN WILSON BROWN, Jr.